United States Patent [19]

Schmidt

[11] 4,073,364
[45] Feb. 14, 1978

[54] STABILIZED VEHICLE SUSPENSION

[75] Inventor: Wilhelm Schmidt, Enumclaw, Wash.

[73] Assignee: Garrett-Weldco Industries, Inc., Enumclaw, Wash.

[21] Appl. No.: 625,367

[22] Filed: Oct. 24, 1975

[51] Int. Cl.² .................................................. B62D 5/10
[52] U.S. Cl. ...................................... 180/139; 280/111
[58] Field of Search ............... 180/134, 135, 136, 137, 180/138, 139, 51, 14 R, 51; 280/111

[56] References Cited

U.S. PATENT DOCUMENTS

| | | | |
|---|---|---|---|
| 1,830,748 | 11/1931 | Brown | 280/111 |
| 2,936,037 | 5/1960 | Anderson | 180/135 |
| 3,191,709 | 6/1965 | Symons | 180/51 |
| 3,643,898 | 2/1972 | Whitener | 280/111 X |

FOREIGN PATENT DOCUMENTS

| | | | |
|---|---|---|---|
| 1,905,157 | 1/1971 | Germany | 180/51 |

*Primary Examiner*—Joseph F. Peters, Jr.
*Assistant Examiner*—John A. Pekar
*Attorney, Agent, or Firm*—Seed, Berry, Vernon & Baynham

[57] ABSTRACT

An articulated frame log skidder having front and rear wheeled chassis separated by an oscillating suspension which allows the front chassis to rotate with respect to the rear chassis. The axis of rotation between the front and rear chassis is inclined upwardly toward the front of the skidder so that it passes above the center of gravity of the front chassis. Thus, as an excessive force exerted on a rear chassis winch lifts the front wheels above the vehicle-supporting surface, the front chassis remains in a stable condition with its center of gravity beneath the axis of rotation. A horizontal force applied to one of the wheels when the wheel strikes an obstruction is transformed by the inclined axis of rotation into a rotational moment about the axis which lifts the wheel over the obstruction.

6 Claims, 7 Drawing Figures

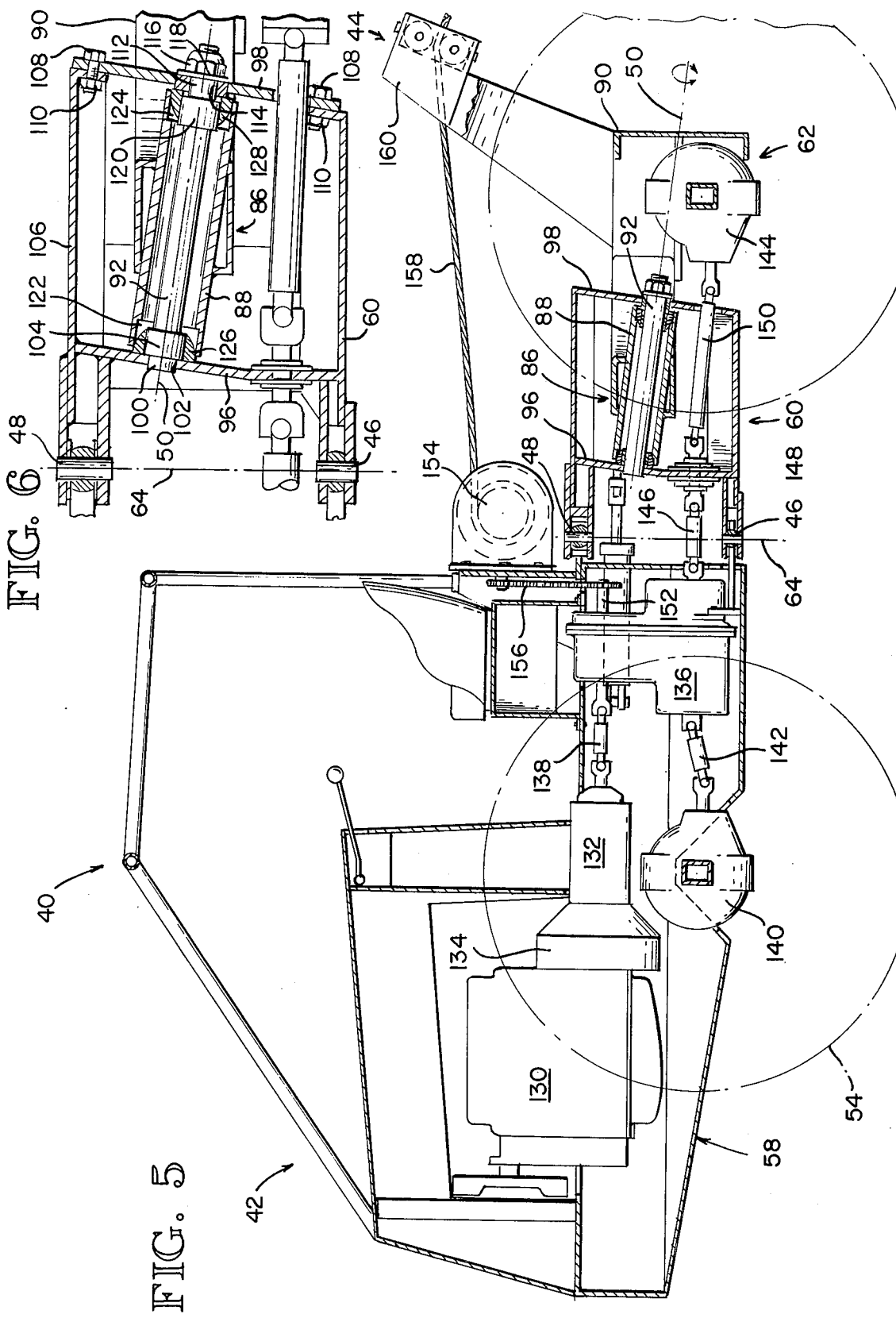

STABILIZED VEHICLE SUSPENSION

BACKGROUND OF THE INVENTION

1. Field of the Invention

This invention relates to a vehicle suspension and, more particularly, to a suspension for allowing front and rear portions of a vehicle to rotate with respect to each other about an axis which extends above the front portion's center of gravity.

2. Description of the Prior Art

The construction and logging industries often use vehicles which must be capable of traveling over rugged, uneven terrain covered with such debris as fallen trees, stumps and rocks. Many of these vehicles utilize an articulated frame whereby steering is accomplished by providing a vertical pivot axis at some point along the length of the vehicle.

In order to maintain all four wheels in contact with the ground, both articulated and nonarticulated vehicles must be provided with a suspension capable of allowing relative vertical movement between the wheels.

One system for performing this function is the independent suspension, in which vertical movement of each of the wheels is independent of the others. However, such suspensions are relatively expensive, and are generally not capable of providing sufficient clearance to allow the vehicle to travel over large obstacles.

Another type of suspension is the trunion-mounted axle wherein the entire axle pivots with respect to the chassis, about a horizontal axis such that as the wheel on one side of the vehicle moves vertically in one direction, the wheel on the opposite side of the vehicle moves the same distance in the opposite direction. A principal disadvantage of this type of suspension is that the mass of the vehicle is free to pivot from side to side, substantially reducing the stability of the vehicle. Such vehicles tend to tip easily, particularly in response to side forces as might be generated when a rear-mounted logging winch is pulling a log which is laterally offset from the vehicle.

A third type of suspension which overcomes many of the aforementioned disadvantages is the oscillating frame suspension. In this type suspension, the vehicle includes two chassis fastened to each other through an oscillating connector which allows each chassis to rotate with respect to the other along a substantially horizontal axis. In the oscillating frame suspension, both axles are immovably secured to their respective chassis, and relative vertical movement of one wheel with respect to the others is accomplished by rotation of the entire chassis. There is a serious safety problem with this system, however, that is not present in the aforementioned suspension systems. Since the axis of rotation between the two chassis passes beneath their respective centers of gravity, both chassis are inherently unstable and, should the wheels of one chassis lose contact with the ground, the raised chassis will rotate to one side about the rotational axis.

SUMMARY OF THE INVENTION

It is an object of this invention to provide an oscillating suspension in combination with an articulated steering mechanism.

It is another object of the invention to provide an oscillating suspension which is inherently stable, thereby preventing rotation of a vehicle chassis when the wheels on that chassis lose contact with the ground.

These and other objects of the invention are accomplished by a vehicle having a pair of wheeled sections fastened to each other through an oscillating connector assembly. The assembly has an axis of rotation extending along the length of the vehicle and passing above the section likely to lose contact with the ground such that the center of gravity of the section is beneath the axis of rotation. Thus, in the event that the section loses contact with the ground, the section remains stably supported in a vertical plane.

It is still another object of the invention to provide a suspension which transforms a horizontal force exerted on a wheel by an obstruction into a vertical force which lifts the wheel over the obstruction.

This and other objects of the invention are accomplished by rotatably connecting forward and rear axles to each other through a rotatable connector either at one of the axles or at a point in the vehicle between the axles. The axis of rotation of the connector is angled upwardly toward the direction the vehicle normally travels so that a horizontal force imparted to one of the vehicle's wheels by an obstruction is transformed into a rotational moment which lifts the wheel above the obstruction.

BRIEF DESCRIPTION OF THE DRAWINGS

FIG. 5 is a side cross-sectional view of the inventive log skidder taken along the line 5—5 of FIG. 7.

FIG. 6 is a detailed cross-sectional view of the oscillating connector assembly taken along the line 6—6 of FIG. 7.

DETAILED DESCRIPTION OF THE INVENTION

Figure 1:
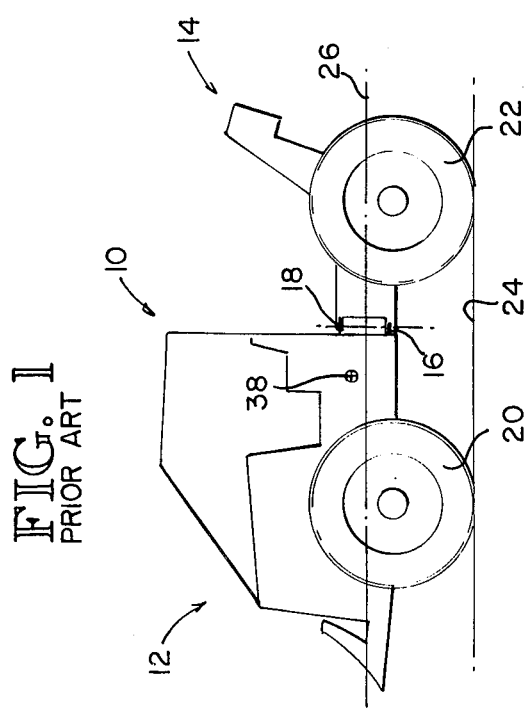
FIG. 1 is a schematic view of a prior art oscillating suspension log skidder showing the axis of rotation between the front and rear chassis with respect to the front chassis's center of gravity.

A conventional oscillating suspension articulated frame log skidder is illustrated in FIG. 1. The skidder 10 includes a forward section 12 connected to a rear section 14 through a pair of articulating joints 16, 18 establishing a vertical pivotal axis. Each section includes a pair of horizontally spaced wheels 20, 22 which contact the ground 24. The forward section 12 is fastened to the rear section 14 through an oscillating connector (not shown) either directly or through an intermediate chassis. The oscillating connector allows the forward section 12 to rotate with respect to the rear section 14 about a horizontal axis 26. The rotational axis 26 extends along the length of the vehicle and passes beneath the center of gravity 28 of the forward section.

Figure 2:
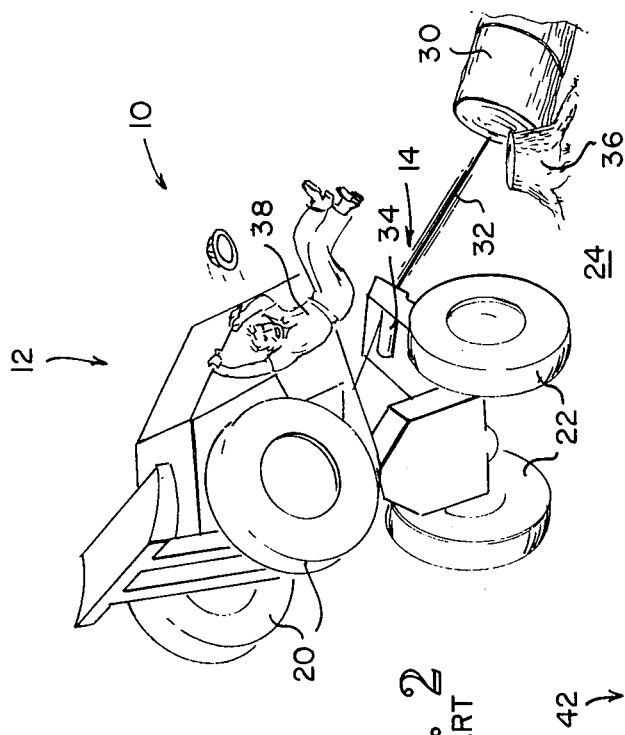
FIG. 2 is an isometric view illustrating the unstable rotation of the forward chassis of the log skidder of FIG. 1 responsive to being lifted off of the ground.

As illustrated in FIG. 2, the log skidder 10 is towing a log 30 by a cable 32 engaging a fairlead 34. The log 30 commonly abuts an obstruction, such as a stump 36, and the momentum of the skidder 10 causes an excessive downward force on the rear section 14, thereby lifting the forward section 12 above the ground 24. With conventional oscillating suspension skidders having an axis of rotation beneath the center of gravity 28 of the forward section 12, the forward section 12 rotates to either side and may even turn upside down, thereby endangering the operator 38 of the skidder.

It is to be understood, however, that the aforementioned problem is not limited to log skidders since the wheels of other type vehicles employing oscillating suspensions may also be lifted above the ground. For example, the rear wheels of a forward-mounted bucket loader attempting to lift an excessive weight are raised above the ground. If the rotational axis passes beneath the center of gravity of the rear section, the rear section is inherently unstable, and rotates to one side about its rotational axis.

Figure 3:
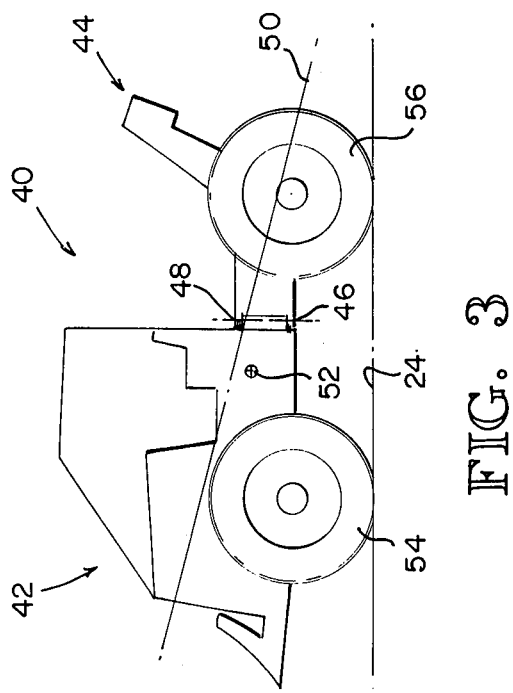
FIG. 3 is a schematic view of the inventive log skidder showing the axis of rotation between the front and rear chassis extending upwardly toward the front chassis and passing above its center of gravity.
Figure 4:
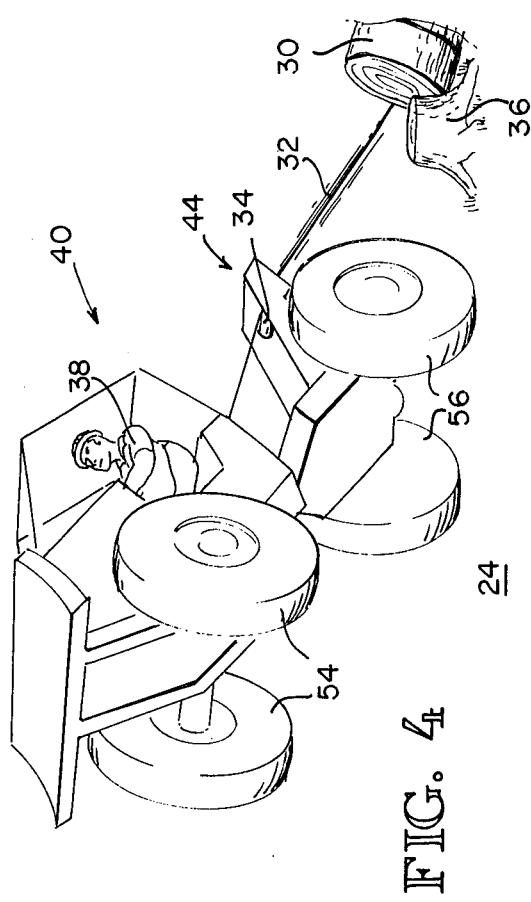
FIG. 4 is an isometric view illustrating the stable condition of the front chassis of the inventive log skidder responsive to being lifted off of the ground.

The inventive vehicle suspension is illustrated on a log skidder in FIG. 3. Like the conventional log skidder 10 illustrated in FIG. 1, the vehicle 40 includes a forward section 42 connected to a rear section 44 through a pair of articulation joints 46, 48 which establish a vertical pivot axis. The forward section 42 is also fastened to the rear section 44 through an oscillating connector (not shown) which establishes a rotational axis 50 extending upwardly toward the forward section 42 such that the rotational axis 50 passes above the center of gravity 52 of the forward section 42. Thus, as illustrated in FIG. 4, when the forward wheels 54 lose contact with the ground 24, the forward section 42 remains stably supported in a substantially vertical position. Although the stabilized oscillating suspension is illustrated here as extending upwardly toward the front of the vehicle, it is understood that the rotational axis would extend upwardly toward the rear of the vehicle where it is expected that the rear wheels may lose contact with the ground. This would be the case, for example, with a front-mounted bucket loader. Alternatively, the rotational axis of the oscillating connector may be substantially horizontal and raised above the center of at least one section. In any case, the rotational axis between the forward and rear sections extends above the center of gravity of the section likely to lose contact with the ground. It will also be understood that the inventive oscillating suspension may be employed in nonarticulating vehicles as well as in the articulating vehicle illustrated herein.

Since the axis of rotation is angled upwardly, a horizontal force applied to one of the wheels can be divided into two orthagonal force components with respect to the rotational axis—one component being along the axis and the other component being perpendicular to the axis. With a horizontal axis of rotation, however, a horizontal force extends only along the rotational axis, and there is no force component perpendicular to the rotational axis. The force perpendicular to the axis of rotation causes the section receiving the horizontal force to rotate about the axis of rotation thereby lifting the wheel to which the horizontal force is applied. This principle allows the wheels to easily climb over obstructions, such as rocks and tree trunks, even when the obstruction has vertical walls extending more than half the height of the wheel.

Figure 7:
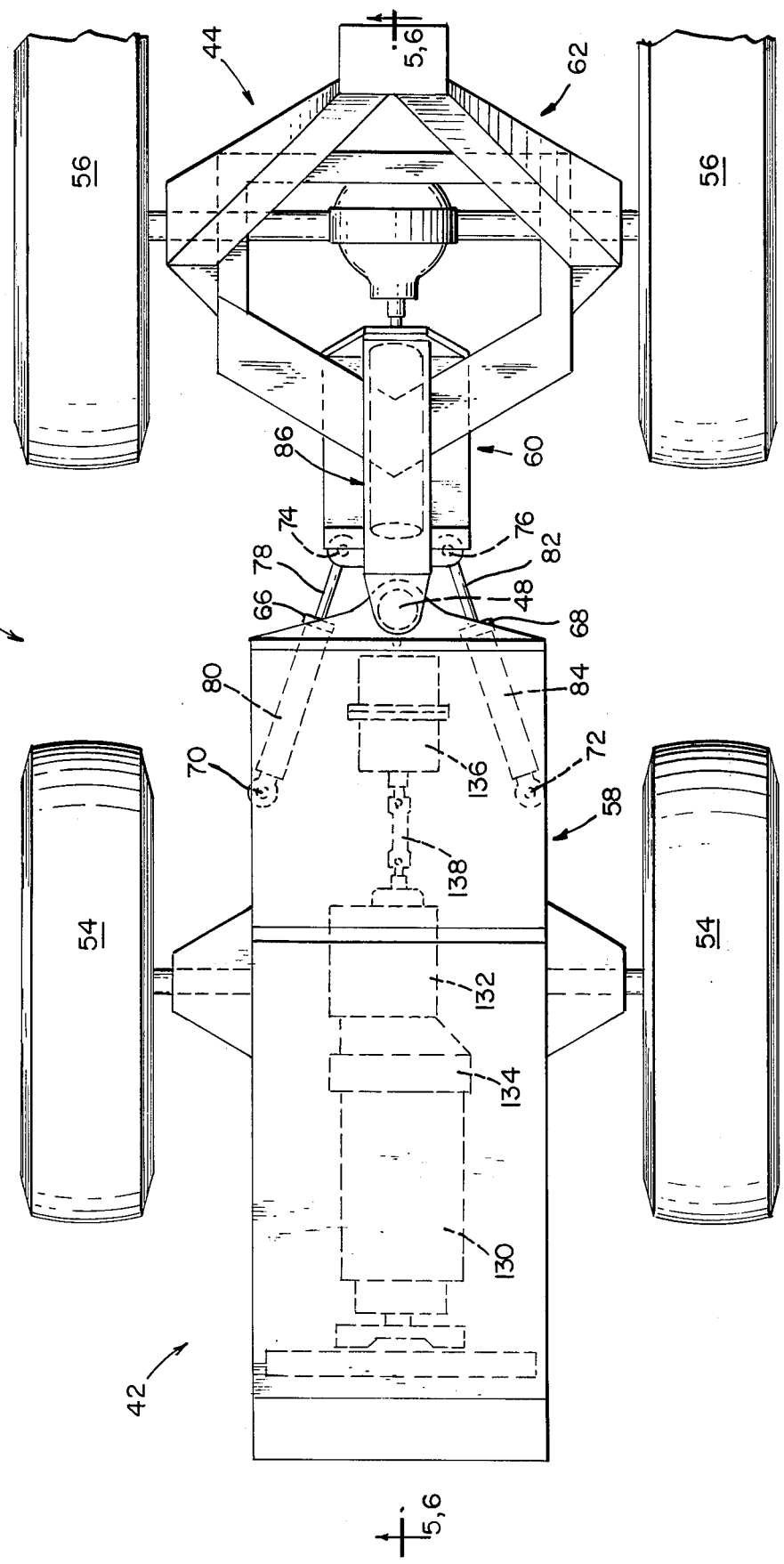
FIG. 7 is a top plan view of the inventive log skidder.

The stabilized oscillating suspension, as used in a log skidder, is best illustrated in FIGS. 5 and 7. The forward section 42 is formed by a single forward chassis 58 while the rear section 44 consists of an intermediate chassis 60 and a rear chassis 62. The forward chassis 58 is connected to the intermediate chassis 60 through the articulation joints 46, 48, which establish a vertical articulation axis 64. The forward chassis 58 is pivoted with respect to the intermediate chassis 60 about the articulation axis 64 by hydraulic actuators 66, 68 which are pivotally connected at 70, 72 to the forward chassis 58 and at 74, 76 to the intermediate chassis 60. The actuators 66, 68 are double acting and act in cooperation such that when the actuating rod 78 extends from the cylinder 80, the actuating rod 82 retracts into the cylinder 84. The flow of hydraulic fluid to the cylinders 80, 84 is controlled by a conventional hydraulic valving system actuated through the steering wheel by the operator.

The intermediate chassis 60 is connected to the rear chassis 62 through an oscillating connector assembly 86, illustrated in greater detail in FIG. 6. The connector assembly establishes a rotational axis 50 that extends upwardly toward the forward chassis 58, and includes a cylindrical support tube 88 having its outer periphery connected to the frame 90 of the rear chassis 62 at an inclined angle. The tube 88 surrounds a concentric support shaft 92 which extends between a pair of parallel, spaced apart frame plates 96, 98 forming part of the intermediate chassis 60. The support shaft 92 provides additional strength to the intermediate chassis, and is fastened to the plates 96, 98 by inserting the forward end 100 of the shaft 92 into an aperture 102 in the forward plate 96 until the face of an integrally formed forward bearing ring 104 abuts the rear surface of the plate 96. The rear plate 98 is then bolted to the intermediate chassis frame 106 using bolts 108 and nuts 110 with the rear end 112 of the shaft 92 inserted through an aperture 114 in the rear plate 98. The rear end 112 of the shaft is threaded, and a bolt 116 is torqued against a washer 118 and the plate 98 until the face of an integrally formed rear bearing ring 120 abuts the forward surface of the plate 98. Outer bearing rings 122, 124 fit within opposite ends of the tube 88, and radial-thrust bushings 126, 128 fit between and slidably contact the inner and outer rings 104, 122 and 120, 124 respectively. The bushings 126, 128 in combination with the bearing rings 122, 124, 104, 120, prevent relative axial movement between the tube 88 and shaft 92 while allowing the tube 88 to rotate co-axially about the shaft 92. It will be understood that other bearing mechanisms, such as tapered roller bearings, may also be used.

The log skidder drive train includes an engine 130 mounted in the forward chassis 58 driving a transmission 132 through a bell housing 134. The transmission 132 drives a transfer box 136 through input shaft 138. The transfer box 136 in turn drives a forward differential 140 through shaft 142 and a rear differential 144 through shaft 146, carrier bearing 148 and shaft 150. Since the shaft 146 extends across the articulation axis 64, conventional means are provided for allowing the length of the shaft 146 to vary as the vehicle articulates. Similarly, the rear drive shaft 150 which extends between the intermediate chassis 60 and rear chassis 62, includes means for varying its length as the two chassis 60, 62 rotate with respect to each other about the axis of rotation 50. Conventional universal joints are also provided between all shafts to allow the shafts to pivot with respect to each other.

A power takeoff 152 from the transfer box 136 drives a winch 154 mounted at the rear of the forward chassis 58 through a drive chain 156. A cable 158 is wrapped on the drum of the winch 154 and extends rearwardly through a fairlead 160 to engage a log (not shown). As excessive forces are exerted on the cable 158, the forward wheels 54, are lifted from the ground, but, since the rotational axis 50 extends above the center of gravity of the forward chassis 58, the forward chassis remains in a substantially vertical position.

The embodiments of the invention in which a particular property or privilege is claimed are defined as follows:

1. A vehicle adapted to travel over irregular terrain, comprising:
   a first-end chassis having a pair of transversely spaced wheels;
   an intermediate chassis connected to said first-end chassis through an articulation joint, said articulation joint having an articulation axis substantially perpendicular to the transverse and longitudinal axis of the respective first-end and intermediate chassis;
   steering means for pivoting said first chassis with respect to said intermediate chassis about said articulation axis;
   a second-end chassis having a pair of transversely spaced wheels; and
   oscillating connector means rotatably connecting said intermediate chassis to said second-end chassis, said connector means having an axis of rotation extending generally along the longitudinal axis of said intermediate chassis and inclined upwardly toward said second-end chassis such that said axis passes above the center of gravity of said second-end chassis whereby said second-end chassis is in stable condition when the wheels of said second-end chassis lose contact with a vehicle-supporting surface.

2. The vehicle of claim 1 wherein said oscillating connector means comprise:
   an inclined support tube secured to said second-end chassis, said tube lying generally along the central longitudinal axis of said second-end chassis;
   a pair of transverse frame plates secured to said intermediate chassis, said plates being spaced apart by the approximate length of said support tube and being perpendicular thereto;
   an inner bearing ring secured to each of said frame plates in coaxial alignment with said support tube;
   a pair of outer bearing rings, each mounted on the inside surface of said support tube at opposite ends thereof; and
   a radial-thrust bushing abutting inner and outer bearing rings at each end of said support tube for preventing relative axial movement between said support tube and inner bearing rings while allowing relative rotational movement between said support tube and inner bearing rings.

3. The vehicle of claim 2, further including a pivot shaft extending between said inner bearing rings, said shaft being internal to and in axial alignment with said support tube.

4. In a vehicle having first and second wheeled sections connected to each other through an oscillating connector allowing said sections to rotate with respect to each other about their respective longitudinal axis, the improvement comprising connector mounting means for positioning the rotational axis of said oscillating connector at an incline such that said rotational axis passes above the center of gravity of said first section whereby said first section is in a stable condition when the wheels of said first section lose contact with the vehicle-supporting surface, said first section including an intermediate chassis connected to said second section through said oscillating connector, and an end chassis having a pair of transversely spaced wheels, said end chassis being connected to said intermediate chassis through an articulation joint, and steering means for pivoting said intermediate and end chassis about said articulation joint.

5. The vehicle of claim 4 wherein said oscillating connector comprises:
   an inclined support tube secured to said end chassis, said tube lying generally along the central longitudinal axis of said end chassis;
   a pair of transverse frame plates secured to said intermediate chassis, said plates being spaced apart by the approximate length of said support tube and being perpendicular thereto;
   an inner bearing ring secured to each of said frame plates in coaxial alignment with said support tube;
   a pair of outer bearing rings, each mounted on the inside surface of said support tube at opposite ends thereof; and
   a radial-thrust bushing abutting inner and outer bearing rings at each end of said support tube for preventing relative axial movement between said support tube and inner bearing rings while allowing relative rotational movement between said support tube and inner bearing rings.

6. The vehicle of claim 5, further including a pivot shaft extending between said inner bearing rings, said shaft being internal to and in axial alignment with said support tube.

* * * * *